(12) United States Patent
Schumacher et al.

(10) Patent No.: US 7,306,667 B2
(45) Date of Patent: Dec. 11, 2007

(54) SILICON-TITANIUM MIXED OXIDE POWDER

(75) Inventors: Kai Schumacher, Hofheim (DE); Martin Moerters, Rheinfelden (DE); Oswin Klotz, Westerngrund (DE); Uwe Diener, Grosskrotzenburg (DE)

(73) Assignee: Degussa AG, Duesseldorf (DE)

( * ) Notice: Subject to any disclaimer, the term of this patent is extended or adjusted under 35 U.S.C. 154(b) by 247 days.

(21) Appl. No.: 11/030,166

(22) Filed: Jan. 7, 2005

(65) Prior Publication Data

US 2005/0183634 A1    Aug. 25, 2005

(30) Foreign Application Priority Data

Jan. 10, 2004    (DE) .................. 10 2004 001 520

(51) Int. Cl.
*C09C 1/36*    (2006.01)
(52) U.S. Cl. .................. 106/446; 423/326; 977/926
(58) Field of Classification Search ................ 106/446, 106/437; 423/326, 598; 424/59, 489; 428/404
See application file for complete search history.

(56) References Cited

U.S. PATENT DOCUMENTS

| | | | | |
|---|---|---|---|---|
| 4,297,143 | A | | 10/1981 | Kleinschm et al. |
| 4,916,107 | A | * | 4/1990 | Brand et al. .................. 502/309 |
| 5,061,473 | A | * | 10/1991 | De Cleyn et al. ........... 423/610 |
| 5,451,390 | A | | 9/1995 | Hartmann et al. |
| 5,762,914 | A | * | 6/1998 | Hartmann et al. ............. 424/59 |
| 6,773,697 | B2 | * | 8/2004 | Hemme et al. ............... 424/65 |
| 6,992,042 | B2 | * | 1/2006 | Hemme et al. ............. 502/350 |

| | | | | |
|---|---|---|---|---|
| 2002/0028361 | A1 | * | 3/2002 | Boire et al. .................. 428/701 |
| 2003/0129153 | A1 | * | 7/2003 | Moerters et al. ............... 424/59 |
| 2003/0134128 | A1 | * | 7/2003 | Oswald et al. .............. 428/446 |
| 2003/0162016 | A1 | * | 8/2003 | Tanaka et al. .............. 428/328 |
| 2003/0232149 | A1 | * | 12/2003 | Oswald et al. .............. 427/453 |

FOREIGN PATENT DOCUMENTS

| | | |
|---|---|---|
| DE | A-2931810 | 2/1981 |
| DE | A-4235996 | 4/1994 |

* cited by examiner

*Primary Examiner*—J. A. Lorengo
*Assistant Examiner*—Pegah Parvini
(74) *Attorney, Agent, or Firm*—Oblon, Spivak, McClelland, Maier & Neustadt, P.C.

(57) ABSTRACT

A silicon-titanium mixed oxide powder contains aggregates of primary particles selected from amorphous silicon dioxide particles, crystalline titanium dioxide particles, and silicon-titanium mixed oxide particles each having an amorphous silicon dioxide fraction and a crystalline titanium dioxide fraction. The silicon-titanium mixed oxide particles predominate in the powder. The powder exhibits a BET surface area of from 20 to 200 $m^2/g$, and a titanium dioxide content in a range of from greater than 10 wt. % to less than 70 wt. %. An X-ray diffractogram of the powder exhibits the diffraction patterns of rutile and anatase, with a rutile/anatase ratio of from 2:98 to 98:2. The powder can be produced by vaporizing a silicon halide and a titanium halide at temperatures of less than 180° C., performing combustion with hydrogen and air in a reaction chamber that is closed off from the earth's atmosphere, separating the solids from gaseous substances, and subsequently removing halide-containing substances from the solids to the greatest possible extent by treatment with steam at temperatures of from 250 to 700° C. The powder can be used in toners.

23 Claims, No Drawings

SILICON-TITANIUM MIXED OXIDE POWDER

BACKGROUND OF THE INVENTION

1. Field of the Invention

The present invention relates to a silicon-titanium mixed oxide powder that can be produced by flame hydrolysis, and to the production and the use of the powder.

2. Discussion of the Background

It is known to produce silicon-titanium mixed oxide powders by flame hydrolysis. This generally involves hydrolyzing a mixture of silicon tetrachloride and titanium tetrachloride in a flame. The flame may be produced, for example, by the reaction of hydrogen and atmospheric oxygen, which gives rise to the water necessary for hydrolysis of the chlorides. The reaction products obtained are the silicon-titanium mixed oxide powder and hydrochloric acid, some of which remains attached to the powder.

However, the processes described in the prior art only give rise to powders with a limited $TiO_2/SiO_2$ ratio.

DE-A-2931810 accordingly claims a silicon-titanium mixed oxide powder which contains 0.1 to 9.9 wt. % titanium dioxide. It is produced by vaporizing silicon tetrachloride, diluting it with preheated air and mixing it in a mixing chamber with hydrogen and titanium tetrachloride and combusting the mixture in a reaction chamber.

DE-A-4235996 claims a silicon-titanium mixed oxide powder which contains 70 to 99 wt. % titanium dioxide. It is produced by vaporizing silicon tetrachloride and transferring it into a mixing chamber by means of an inert gas, where it is mixed with hydrogen, air and titanium tetrachloride and the mixture is combusted in a reaction chamber.

However, it has not been possible with either of these processes to obtain a silicon-titanium mixed oxide powder outside the indicated limits of titanium dioxide. When such attempts have been made, dark colored impurities and coarse particles were often obtained.

SUMMARY OF THE INVENTION

The present invention provides a silicon-titanium mixed oxide powder which comprises fractions of titanium dioxide and silicon dioxide outside the ranges typically obtained using conventional processes. Preferably, the mixed oxide powder contains no dark colored impurities. The present invention also provides a process for producing the silicon-titanium mixed oxide powder.

In embodiments, the present invention provides a silicon-titanium mixed oxide powder produced by flame hydrolysis, which powder consists of aggregates of primary particles, and is characterized in that the primary particles comprise amorphous silicon dioxide, crystalline titanium dioxide or silicon-titanium mixed oxide with an amorphous silicon dioxide fraction and a crystalline titanium dioxide fraction, wherein silicon-titanium mixed oxide primary particles predominate, the powder has a BET surface area of between 20 and 200 $m^2/g$, a titanium dioxide fraction of greater than 10 wt. % and less than 70 wt. %, and an X-ray diffractogram exhibits the diffraction pattern of rutile and anatase, wherein the rutile/anatase ratio is 2:98 to 98:2.

DETAILED DESCRIPTION OF PREFERRED EMBODIMENTS

When the silicon-titanium mixed oxide powder of the present invention is produced by a flame hydrolysis process, the primary particles are the particles that are formed first in the flame hydrolysis. In the powder according to the invention, the primary particles are present as amorphous silicon dioxide, crystalline titanium dioxide and silicon-titanium mixed oxide primary particles. The amorphous or crystalline state may, for example, be determined by high-resolution TEM micrographs, on which the lattice planes of the crystalline fractions can be recognized.

Silicon-titanium mixed oxide primary particles should be taken to mean those which, in high-resolution TEM micrographs, exhibit domains of amorphous silicon dioxide and crystalline titanium dioxide. These predominate in the mixed oxide powder according to the invention. This means that, by counting the primary particles from TEM micrographs, at least 80%, generally more than 95%, of the primary particles are silicon-titanium mixed oxide primary particles. The primary particles intergrow during the reaction by sintering together into aggregates. The aggregates may form additional agglomerates over the further course of the reaction.

The mixed oxide powder according to the invention exhibits a BET surface area of between 20 and 200 $m^2/g$, and a titanium dioxide content of greater than 10 wt. % and less than 70 wt. %. The diffraction patterns of rutile and anatase appear in the X-ray diffractogram. Preferably, no fractions of crystalline silicon dioxide or titanium silicates are detected.

The rutile/anatase ratio in the powder according to the invention is 2:98 to 98:2. The rutile/anatase ratio may preferably be between 80:20 and 95:5.

A mixed oxide powder according to the invention with a BET surface area of 80 to 130 $m^2/g$ may be preferred.

It may furthermore be preferred that the titanium dioxide fraction amounts to 40 to 60 wt. %.

The mixed oxide powder according to the present invention may furthermore exhibit a tamped density of 20 to 140 g/l, wherein values of 30 to 70 g/l may be particularly preferred.

The mixed oxide powder according to the invention may furthermore exhibit a chloride content which is less than 0.5 wt. %. A chloride content of less than 0.3 wt. % may be particularly preferred.

The invention also provides a process for the production of the silicon-titanium-mixed oxide powder, which process is characterized in that a silicon halide and a titanium halide, preferably titanium tetrachloride, are vaporized in a ratio such that the silicon-titanium mixed oxide powder of the corresponding composition is obtained, the vapors are transferred, mixed or separately, into a mixing chamber by means of a carrier gas, wherein the vaporization temperature is less than 180° C. and separately therefrom, hydrogen, primary air, which may optionally be enriched with oxygen and/or preheated, is transferred into the mixing chamber, then the mixture consisting of the silicon halide and titanium tetrachloride vapours, hydrogen and primary air is ignited in a burner and the flame is combusted into a reaction chamber which is closed off from the ambient air, secondary air is additionally introduced into the reaction chamber, wherein the primary air/secondary air ratio is between 0.25 and 10, the solids are then separated from the gaseous substances, and halide-containing substances are subsequently removed from the solids to the greatest possible extent by treatment with steam at temperatures of from 250 to 700° C.

In a preferred embodiment, the vaporization temperature may be less than 160° C.

Silicon tetrachloride, methyltrichlorosilane and/or trichlorosilane may preferably be used as silicon halides.

It may furthermore be advantageous if the discharge velocity of the reaction mixture from the burner into the reaction chamber is between 10 and 80 m/s.

It is likewise possible additionally to introduce up to 25 g of steam/m$^3$ of primary air into the mixing chamber.

The present invention also provides for the use of the mixed oxide powder in toner mixtures, in cosmetic preparations, in particular in sunscreen preparations, as a catalyst, as a catalyst support and as a photocatalyst.

EXAMPLES

Analysis:

BET surface area is determined according to DIN 66131.

The content of SiO$_2$ and TiO$_2$ is determined by X-ray fluorescence analysis.

Tamped density is determined on the basis of DIN ISO 787/XI K 5101/18 (unscreened).

The pH value is determined on the basis of DIN ISO 787/IX, ASTM D 1280, JIS K 5101/24.

Determination of chloride content: Approximately 0.3 g of the particles according to the invention are accurately weighed out, combined with 20 ml of 20% analytical grade sodium hydroxide solution and transferred with stirring into 15 ml of cooled HNO$_3$. The chloride fraction in the solution is titrated with AgNO$_3$ solution (0.1 mol/l or 0.01 mol/l).

Example 1

Invention Example 3.24 kg/h of silicon tetrachloride and 2.70 kg/h of titanium tetrachloride are vaporized together in an evaporator at 160° C. The vapors are transferred into a mixing chamber by means of 15 Nm$^3$/h of nitrogen as carrier gas. Separately therefrom, 2.97 Nm$^3$/h of hydrogen and 13.3 Nm$^3$/h of primary air are introduced into the mixing chamber. The reaction mixture is introduced in a central tube into a burner and ignited. The flame here burns in a water-cooled flame tube. 20 Nm$^3$/h of secondary air are additionally introduced into the reaction chamber. The resultant powder is separated in a downstream filter and then treated countercurrently with steam at 520° C.

Example 2

Invention Example

Example 2 is performed in the same manner as Example 1, but with modified quantities of silicon tetrachloride and titanium tetrachloride, which are additionally separately vaporised.

Examples 3 to 13

Invention Example

Examples 3 to 13 are performed in a similar manner to Example 1, the particular test settings being stated in the following Table. In Example 13, methyltrichlorosilane is used instead of silicon tetrachloride.

Examples 14 and 15

Invention Example

Examples 14 and 15 are performed in the same manner as Example 2, but additional steam is introduced into the mixing chamber.

Examples 16 and 17

Comparative Example

Examples 16 and 17 are performed in the same manner as Example 1, but at higher vaporization temperatures. The powders exhibit dark colored particles.

Example 18

Comparative Example

Example 18 is performed in the same manner as Example 1, but without secondary air. The powder contains coarse particles.

The process parameters and material parameters of the Examples according to the invention and the Comparative Examples are summarized in the following Table.

The disclosure of the DE 10 2004 001 520.1 priority document, which was filed in Germany on Jan. 10, 2004, is incorporated by reference herein in its entirety.

TABLE

| | Process parameters | | | | | | | | Material parameters | | | | | |
|---|---|---|---|---|---|---|---|---|---|---|---|---|---|---|
| Example | SiCl$_4$ kg/h | TiCl$_4$ kg/h | T$_{vap.}$(5) ° C. | H$_2$ m$^3$/h | Prim. air m$^3$/h | Sec. air m$^3$/h | v$_B$(6) m/s | T$_{deacid}$(7) ° C. | BET m$^2$/g | SiO$_2$/ TiO$_2$(3) wt. % | Rutile/ anatase | pH | Tamped density g/l | Chloride wt. % |
| 1 | 3.24 | 2.70 | 160 | 2.97 | 13.30 | 20.00 | 36.0 | 520 | 117 | 45/55 | 5/95 | 3.6 | 47 | 0.10 |
| 2 | 3.60 | 3.00 | 160 | 2.50 | 9.70 | 20.00 | 26.9 | 520 | 79 | 47/53 | 15/85 | 3.6 | 53 | 0.16 |
| 3 | 3.60 | 2.85 | 160 | 2.50 | 9.80 | 20.00 | 27.9 | 350 | 88 | 48/52 | 10/90 | 3.5 | 66 | 0.30 |
| 4 | 3.60 | 3.00 | 160 | 3.30 | 13.30 | 20.00 | 36.9 | 520 | 100 | 50/50 | 9/91 | 3.7 | 48 | 0.20 |
| 5 | 3.60 | 3.00 | 160 | 2.40 | 11.80 | 20.00 | 31.5 | 350 | 125 | 47/53 | 4/96 | 3.5 | 42 | 0.48 |
| 6 | 3.90 | 2.80 | 160 | 2.50 | 11.50 | 20.00 | 31.5 | 400 | 130 | 56/44 | 4/96 | 3.8 | 46 | 0.26 |
| 7 | 4.00 | 2.70 | 160 | 2.50 | 9.60 | 20.00 | 27.1 | 400 | 92 | 55/45 | 11/89 | 3.8 | 47 | 0.08 |

TABLE-continued

|  | Process parameters | | | | | | | | Material parameters | | | | | |
|---|---|---|---|---|---|---|---|---|---|---|---|---|---|---|
| Example | SiCl$_4$ kg/h | TiCl$_4$ kg/h | T$_{vap.}$[5] °C. | H$_2$ m$^3$/h | Prim. air m$^3$/h | Sec. air m$^3$/h | v$_B$[6] m/s | T$_{deacid}$[7] °C. | BET m$^2$/g | SiO$_2$/ TiO$_2$[3] wt. % | Rutile/ anatase | pH | Tamped density g/l | Chloride wt. % |
| 8 | 4.00 | 2.70 | 160 | 2.50 | 11.60 | 20.00 | 31.7 | 450 | 130 | 56/44 | 9/91 | 3.6 | 43 | 0.13 |
| 9 | 1.80 | 3.50 | 160 | 2.60 | 11.50 | 15.00 | 28.1 | 500 | 91 | 35/65 | 10/90 | 3.7 | 50 | 0.21 |
| 10 | 2.94 | 0.47 | 160 | 2.80 | 8.20 | 20.00 | 32.0 | 650 | 47 | 85/15 | 29/71 | 3.6 | 70 | 0.18 |
| 11 | 3.90 | 2.80 | 160 | 2.50 | 13.5 | 25.00 | 41.0 | 650 | 188 | 58/42 | 3/97 | 4.0 | 135 | 0.39 |
| 12 | 3.60 | 3.00 | 160 | 2.50 | 7.80 | 2.00 | 21.0 | 450 | 43 | 51/49 | 8/92 | 3.6 | 61 | 0.09 |
| 13[1] | 3.90 | 2.80 | 160 | 1.20 | 14.0 | 20.00 | 29.0 | 450 | 112 | 58/42 | 8/92 | 3.7 | 54 | 0.21 |
| 14[2] | 3.60 | 3.00 | 160 | 3.30 | 13.30 | 20.00 | 36.9 | 450 | 83 | 48/52 | 14/86 | 3.9 | 51 | 0.25 |
| 15[2] | 4.00 | 2.70 | 160 | 2.50 | 9.70 | 20.00 | 27.3 | 450 | 93 | 54/46 | 13/87 | 3.0 | 52 | 0.30 |
| 16[4] | 3.24 | 2.70 | 205 | 2.97 | 13.30 | 20.00 | 36.0 | 520 | 112 | 45/55 | 5/95 | 3.5 | 50 | 0.23 |
| 17[4] | 3.60 | 2.85 | 230 | 2.50 | 9.80 | 20.00 | 27.9 | 350 | 91 | 48/52 | 10/90 | 3.7 | 59 | 0.40 |
| 18[4] | 2.94 | 0.47 | 160 | 2.80 | 8.20 | 20.00 | 32.0 | 650 | 43 | 83/17 | 31/69 | 3.5 | 68 | 0.21 |

[1]methyltrichlorosilane instead of SiCl$_4$;
[2]additional steam in mixing chamber: Ex. 14: 10 g/m$^3$ of primary air, Ex. 15: 20 g/m$^3$ of primary air;
[3]uniformity of powder composition determined by 5 randomly taken samples of a powder;
[4]Comparative Example;
[5]T$_{vap}$ = vaporization temperature;
[6]V$_B$ = discharge velocity from burner;
[7]= T$_{deacid}$ = Temperature of deacidfication

What is claimed is:

1. A silicon-titanium mixed oxide powder comprising aggregates of at least two types of primary particles selected from the group consisting of
   amorphous silicon dioxide particles;
   crystalline titanium dioxide particles; and
   silicon-titanium mixed oxide particles, each silicon-titanium mixed oxide particle containing an amorphous silicon dioxide fraction and a crystalline titanium dioxide fraction, wherein
   a BET surface area of the powder is in a range of from 20 to 200 m$^2$/g;
   a titanium dioxide content of the powder is in a range of from greater than 10 wt. % to less than 70 wt.%; and
   an X-ray diffractogram of the powder contains diffraction patterns of rutile and anatase in a rutile/anatase ratio ranging from 2:98 to 98:2.

2. The silicon-titanium mixed oxide powder according to claim 1, wherein the BET surface area of the powder is in a range of from 80 to 130 m$^2$/g.

3. The silicon-titanium mixed oxide powder according to claim 1, wherein the titanium dioxide content of the powder is in a range of from 40 to 60 wt.%.

4. The silicon-titanium mixed oxide powder according to claim 1, wherein a chloride content of the powder is less than 0.5 wt.%.

5. The silicon-titanium mixed oxide powder according to claim 1, wherein the powder has a tamped density in a range of from 20 to 140 g/l.

6. A method of making a silicon-titanium mixed oxide powder, the method comprising
   flame hydrolyzing a gaseous mixture comprising a silicon halide and a titanium halide; and
   producing the powder of claim 1.

7. The method according to claim 6, wherein the titanium halide is titanium chloride.

8. The method according to claim 6, further comprising vaporizing both the silicon halide and the titanium halide at a vaporization temperature of less than 180° C.; and forming the gaseous mixture.

9. The method according to claim 8, wherein the vaporization temperature is less than 160° C.

10. The method according to claim 6, wherein the silicon halide comprises at least one selected from the group consisting of silicon tetrachloride, methyltrichlorosilane and trichlorosilane.

11. The method according to claim 6, further comprising mixing with the silicon halide and the titanium halide, before the flame hydrolyzing, hydrogen and a primary air, which is optionally enriched with oxygen and optionally pre-heated.

12. A method of using a silicon-titanium mixed oxide powder, the method comprising adding the powder of claim 1 to a toner mixture.

13. A method of using a silicon-titanium mixed oxide powder, the method comprising adding the powder of claim 1 to a cosmetic preparation.

14. The method according to claim 13, wherein the cosmetic preparation is a sunscreen preparation.

15. A method of using a silicon-titanium mixed oxide powder, the method comprising catalyzing a reaction with the powder of claim 1.

16. A method of using a silicon-titanium mixed oxide powder, the method comprising supporting a catalyst on the powder of claim 1.

17. The silicon-titanium mixed oxide powder according to claim 1, which comprises silicon-titanium mixed oxide particles and wherein at least 80% of the primary particles in the powder are the silicon-titanium mixed oxide particles.

18. A method of making a silicon-titanium mixed oxide powder, the method comprising
   flame hydrolyzing a gaseous mixture comprising a silicon halide and a titanium halide; and
   producing the powder of claim 17.

19. A method of using a silicon-titanium mixed oxide powder, the method comprising adding the powder of claim 17 to a toner mixture.

20. A method of using a silicon-titanium mixed oxide powder, the method comprising adding the powder of claim 17 to a cosmetic preparation.

21. The method according to claim 17, wherein the cosmetic preparation is a sunscreen preparation.

22. A method of using a silicon-titanium mixed oxide powder, the method comprising catalyzing a reaction with the powder of claim 17.

23. A method of using a silicon-titanium mixed oxide powder, the method comprising supporting a catalyst on the powder of claim 17.

* * * * *